United States Patent [19]

Taylor

[11] 4,025,268

[45] May 24, 1977

[54] ARTICLES MOLDING APPARATUS

[76] Inventor: Don A. Taylor, Box No. 4, Wadsworth, Ohio 44281

[22] Filed: Feb. 24, 1975

[21] Appl. No.: 552,043

Related U.S. Application Data

[62] Division of Ser. No. 343,646, March 22, 1973, abandoned.

[52] U.S. Cl. .............................. 425/246; 425/256; 425/258; 425/261; 425/338; 425/411; 425/422; 425/437; 425/447; 425/451.9; 425/DIG. 201

[51] Int. Cl.² ........................ B29C 5/00; B29F 1/00

[58] Field of Search .......... 425/256, 338, 339, 411, 425/406, 412, 420, 437, 242 R, 422, 451.9, DIG. 200, DIG. 201, 447, 246; 264/325

[56] References Cited

UNITED STATES PATENTS

| | | | |
|---|---|---|---|
| 1,515,381 | 11/1924 | Boyer et al. | 264/325 X |
| 2,775,760 | 12/1956 | Brown et al. | 264/325 X |
| 3,158,898 | 12/1964 | Northrup et al. | 425/256 |
| 3,266,086 | 8/1966 | Markevitch | 425/411 X |
| 3,511,845 | 5/1970 | Scalora | 264/325 X |
| 3,613,165 | 10/1971 | Corey | 264/325 X |
| 3,660,002 | 5/1972 | Morroni | 425/437 X |
| 3,671,156 | 6/1972 | Robbins | 425/256 X |

*Primary Examiner*—Robert L. Spicer, Jr.
*Attorney, Agent, or Firm*—John Harrow Leonard

[57] ABSTRACT

Plasticizable material is pressure molded into articles free from flash in mold cavities of specialized molds defined by separate mold sections with removable cores. Prior to and during molding, the sections are held clamped together to fully confine the material which is pressurized by reducing the volumetric capacity of each cavity. This pressurization is maintained until the material is set or cured, and may be increased before final set to forge or densify the material further. The method employs a conventional press and two gangs of specialized two-piece, multi-cavity molds. The molds of each gang are supported in a horizontal row, with their juxtaposed flat faces and parting planes disposed vertically, for movement of each mold section flatwise endwise of the row to open and closed positions. The mold sections are clamped closed by power means which apply extraneous clamping pressure independently of the press operation. The gangs are supported so that as one clamped gang is moved into molding position in the press the other clamped gang is moved out of the molding position to an unloading and recharged position wherein it is unloaded and recharged while molding is being effected by the gang in molding position. Each mold cavity has an entry passage which opens through the upper edge of its associated mold sections. In the charge position, predetermined charges of the material are introduced into the cavities, respectively, through the entry passages. The clamped gang is moved as a unit into the operating or mold space of the press. Therein, plungers, carried by the press platen and driven by the closing force of the press, enter the entry passages and move therealong so as to progressively reduce the volumetric capacities of the cavities concurrently and thereby pressurize and forge the material therein to the degree desired. The extraneous clamping pressure is sufficient pressure to prevent any escape of material from the cavities at the parting surfaces of the mold sections.

13 Claims, 13 Drawing Figures

ARTICLES MOLDING APPARATUS

This is a division of application Ser. No. 343,646, filed Mar. 22, 1973, now abandoned.

BACKGROUND OF INVENTION

1. Field of Invention

Molding of settable plastic material.

2. Description of Prior Art

The method commonly used for the molding of articles of plastic materials, such as vulcanizable rubber and thermo-setting and thermoplastic materials, employs compression molds consisting of top and bottom plates or sections having mating cavities in each of which a core pin is supported with proper clearance. The plates are supported with the parting surfaces horizontal and the uncured material to be molded is introduced into each cavity by placing a first semi-solid sheet thereof in the bottom mold cavity under the core pin and a second like sheet over the core pin. The mold plates are disposed in a conventional press with their parting surfaces or planes horizontal, closed under the pressure applied by the press, and then heated or otherwise treated to cure the material therein.

In this prior method of compression molding material in excess of that required for the article must be introduced into each cavity in order to develop proper molding pressure on the material when the mold is closed, the excess being squeezed out as flash before the mold plates reach fully closed position. Even with an exceptionally good mold and careful charging there is always some flash. With horizontally disposed cavities, spillage of part of the charge is a problem. The flash material which is squeezed out of the cavities into the space between the mold plates, or into flash accumulating passages or pockets disposed at the parting surface of the plates, is relatively thin and begins to set quickly. As a result this flash material developes low flow and compressive characteristics which resist full closure of the mold plates and require very high total press pressure to drive the plates close to fully closed position. If too much material is introduced a higher pressure results and more is produced around the entire article. If not enough material is introduced, the mold cavity may be insufficiently filled and the material may be molded under insufficient pressure with the result that defective articles are produced. If the material is unsymmetrically distributed in an open mold, even with the proper charge, much of the charge can escape from the mold cavity as flash leaving insufficient material to be distributed and fill the cavity upon closure of the mold.

Unless the number of cavities is limited, this resistance exceeds the capacity of the press to close the molds fully and produce precisely shaped and dimensioned articles with a small amount of flash. In any event, the articles tend to have a degree of porosity due to the limitation of pressure on the material in the cavities resulting from the excess being permitted to escape as flash. Further, the dead weight of the molds limits the number which can be handled in the conventional vertically stacked condition by an individual workman. Careful material preparation is necessary for product consistency and considerable time and expense in production are required for material preparation and subsequent removal of flash. The amount of flash is considerable and constitutes a very substantial waste of material.

As one example, in the prior methods commonly utilized in molding tubular golf club handle grips, molds of about two feet square with approximately fourteen cavities per mold are used, and require a curing cycle of approximately eight to ten minutes. Normally, not more than two molds stacked vertically flatwise are used during each press cycle because their combined weight exceeds the power of a workman to manipulate them.

Sometimes the molds are of the transfer type in which the material is charged into a transfer pot and partially plasticized and transferred to the cavities by way of sprue holes.

Another method currently used is the conventional injection molding. Precisely shaped articles can be produced by this method, but flashless articles cannot be produced thereby because the extreme pressures required for injection molding separate the mold plates or sections slightly with the result that flash material is forced into the spaces therebetween. The high pressures are necessitated by the fact that the runners connected with the sprue, or sprues, are usually of small cross section and, in turn, connect with very small gates leading into the mold cavities. For example, the gates are often about 1/32 of an inch in diameter. Runners and gates of this nature are desirable because of the frictional and shearing effects they have on the material being injected, which effects raise the temperature of the material and maintain it at the higher temperature and in better plasticized condition in the mold. Because of these effects, the heat control must be precisely balanced in relation to the flow characteristics of the runners and gates if consistent filling of all of a large number of cavities concurrently is to be realized. If the material introduced into the sprue is too warm, the additional frictionally generated heat added to the initial heat often over-cures the material. If the material being injected is not sufficiently warm, the material cannot pass through the runners and gates properly to assure filling of the cavities. Further, such molds must necessarily be exposed to very high holding pressures by the press, due to the reactive forces imposed by the high pressure of the material in the runners, cavities, and spaces between mold plates at the parting surface into which the material escaped. As a result air and gases cannot escape readily and the entrapped air results in the formation of defective and blistered articles.

Since the plasticizable material must be preheated to a high temperature and kept at that temperature to assure a proper flow through the small runners and gates, a long cooling cycle is required. The number of molds that can be filled with one injection is limited thereby and by the capacity of the plasticizing cylinder.

SUMMARY

With the present method and apparatus, specialized mold sections or plates are closed and held together tightly independently of press operation. The amount of charge can be predetermined easily and accurately, and limited closely to the amount required in the article, without under-fill, over-fill, or spillage. The final article can be densified by a forging action on the molded and partially set charge of material in each cavity, as distinguished from the mere pressure molding by closing the mold sections or injection molding, as in prior methods. As a result the articles are more dense and have better physical properties.

An increase in pressure on the material in the cavities may be greater than that obtainable by the mere closure of the molds as in conventional pressure molding, and can range from relatively low pressure to pressures higher than used in either conventional or injection molding.

The formation of flash can be eliminated, or controlled, as desired. This is due to holding the molds clamped under desired pressure independently of the press operation and to the fact that when the ultimate pressure is applied, the material has partially set, at least at the surface of the cavity walls, and thereby its resultant reduced fluidity at the time of the highest pressure augments the resistance to entry between the tightly closed mold plate at their parting surfaces and eliminates biasing them apart.

Further, in accordance with the present method and appartus, the material can be plasticized before introduction into the sprue and runners without any danger of overheating therein. This is accomplished by using large runners and large openings into the cavities. The material is introduced at lower temperatures and the cooling cycle is thereby reduced. Again, the material may be introduced at selected degrees of plasticization less than fully plasticized and the complete or desired greater plasticization can be effected in the mold cavities by reduction of the volumetric capacity thereof and the heating of the molds.

For example, assume the material were one requiring 1 minute at 400° F. to become fully plasticized. It would thereafter have to be cooled from 400° to 150° F., thus requiring another minute. On the other hand, it could be partially plasticized in half a minute at 300° F. and be introduced into the mold in partially plasticized condition. Consequently, it need be cooled from only 300° to 150° F., which would require one half to three quarters of a minute. This would amount to a reduction of time in the production cycle from two minutes to about one minute.

Another distinct advantage is that the article can be molded initially under pressure adequate to assure firmness, and immediately forged by an increase in pressure to a predetermined density greater than would result from the initial molding operation itself with resultant better plasticization and conformance to the shape of the cavity. Such latter "forging" effect is comparable to the cold forming of metal or forging at moderately elevated temperatures, as compared to the forming of such metal under highly elevated temperatures. The pressure that can be used for the forging is not limited altogether by the size of the charge as in the prior art and is not dependent upon the relation of the mold plates at their parting surfaces during molding, as in conventional compression molding.

The present method and apparatus have advantages over conventional injection molding methods and apparatus in assuring precise filling of all of a large number of cavities and the elimination of flash. Further, the material in the pre-plasticizing device and the passages leading therefrom to the mold runners remains sufficiently fluid and plasticizable so that it can be forced into, and molded by, the next succeeding gang of molds.

The degree of density of the article can be controlled simply by controlling the degree of reduction of the volumetric capacity of the cavities and the initial size of the charge. For extremely dense articles, a larger charge may be used without any greater decrease in the volumetric capacity of the cavities than would be required for a like article of less density.

By the present manner of arranging and supporting the molds in a gang, many molds can be charged concurrently, and one gang can be charged while the other is performing its molding operation, and a workman can manipulate a large number of molds as a unit.

As a comparison with prior compression molding, assuming the present method is to be performed in a conventional press with an operating mold space equal to that heretofore used for producing the same articles by compression molding, a greatly increased number of molds can be stacked and concurrently operated during each press cycle. Each of the molds may contain a much larger number of cavities, since the flash biasing phenomenon is eliminated. Thus, in the prior compression molding practices, with a two foot square press, two fourteen cavity molds, representing a total of 28 cavities, can be used. These are charged, closed and placed in the press for molding and curing, then removed from the press, opened, and the articles, usually connected together by the flash, are removed, the molds are recharged and returned to the press, and the flash removed. In comparison, the present new method and improved mold apparatus permits molding with the same size press, in stacks of four or more molds of 25 cavities each, concurrently, thus providing as many as 100 or more cavities of the same size and shape as before.

Thus, using the present method and apparatus, complete filling and proper molding by each cavity is assured and the articles and flashless and more dense in the "as molded" condition than are those produced by the prior methods and apparatus. Again, a plurality of different types of products can be molded concurrently in any single one of the molds, or the products molded in any one or more molds may be of a different type than those concurrently molded in other molds in the same stack, thus rendering production of special small lots of articles economical.

These advantages are obtained by supporting the molds in face to face juxtaposed relation in a horizontal row, with their flat faces and parting surfaces upright and clamping the molds together in the row, by means operable independently of the press, sufficiently firmly to prevent their separation upon subsequent pressurizing to a high degree. The independent clamping pressure applied prior to pressurizing, and maintained during molding, eliminates the formation of flash on the molded articles, thereby eliminating the biasing of the mold sections to open position by flash therebetween, and the prior expensive trimming and finishing steps. A large number of molds also can be handled in stacked condition in gangs, and manipulated readily, by a single workman. One gang within the operating space of the press is being used for molding articles while the other gang is supported outside of the operating space of the press and being unloaded and reloaded. The molds of both gangs can be moved concurrently by means which move the gang which is outside of the press into position for molding. Preferably this is done by a reciprocable common power driven carrier which is operated in opposite directions alternately. Thus the time cycle is greatly reduced, the molds at all times remaining warm between molding operations.

Various specific objects and advantages will become apparent from the following description wherein reference is made to the drawing wherein, for purposes of illustration, the invention is shown as applied to the molding of hollow, tubular golf club handle hand grips.

Referring to the drawings, the special apparatus used in the present invention is shown as combined with a conventional press 1 of the compression, injection, or transfer type. The press comprises a base 2 supporting a cylinder 3 in which a piston or ram 4 is vertically reciprocable. At its upper end the piston or ram is provided with a bolster plate 5. Suitable tie or strain rods 6 are arranged at the corners of the bolster plate and support a head plate 7. Thus a mold receiving or operating space is provided between the bolster plate 5 and the head plate 7. This press structure is conventional, and is used without change in the present invention.

Figures 7, 8:
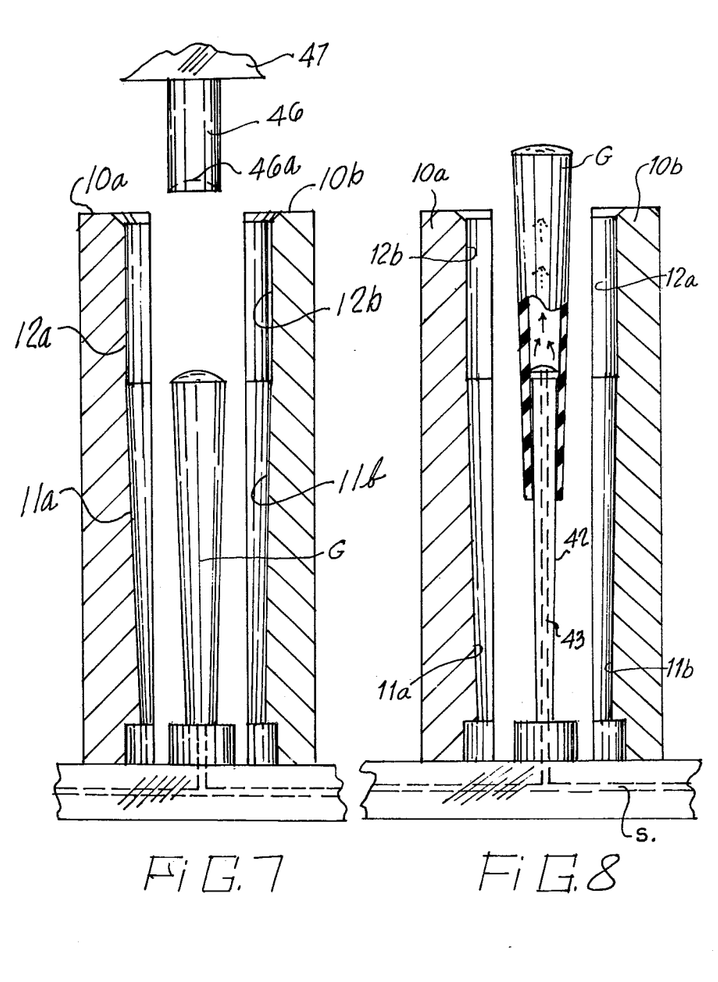
FIG. 7 is a view similar to FIG. 6, showing the open mold at the completion of the molding operation.
FIG. 8 is a view similar to FIG. 7, showing the mold in open position and the removal of the molded article therefrom by pressurized air.

In accordance with the present invention, a plurality of molds 10, each comprised of two mold sections or plates 10a and 10b, are provided. These molds are of the conventional type in which cavities usually are formed partly in one section and partly in the other at opposite sides of the parting plane or surface. The mold sections are moved relatively toward each other into face to face relation and in such position define molding cavities 11. They are separable in a direction flatwise for unloading the molded articles, as indicated at FIG. 7. In the form illustrated, the article is a golf club handle grip G in the form of a hollow sleeve closed at one end and open at the other for receiving the outer end of a gold club axially. As distinguished from the molds heretofore provided, each mold 10 comprises two sections, 10a and 10b, respectively, and each mold has a cavity entry passage 12 for each cavity 11 formed in one portion 12a in the mold section 10a and one portion 12b in the mold section 10b. This entry passage may be of any desired length depending upon the article to be formed and the pressure to be applied to the material. Preferably it is cylindrical and in cross section is coextensive with the outer end of the article to be formed, such as the hand grip G, so that, for reasons hereinafter explained, the molded article will be free from flash in its "as molded" condition.

Contrary to the prior practice, in which a plurality of stacked molds are to be used concurrently, the molds are "stacked" in a horizontal row with their flat faces and parting planes vertical; that is, on edge rather than with their parting planes horizontal. The molds are arranged in a row in this flatwise stacked relation for movement of the sections 10a and 10b of each mold flatwise and toward and away from each other during the opening and closing of the molds and for clamping the sections in closed position and the molds into a stacked gang which can be moved endwise of the row as a unit. The molds are arranged in two separate gangs. Clamping means are provided and are operable independently of the press operation to move the mold sections into closed position, to move the molds into face to face juxtaposition, to hold the molds firmly in the closed position and said stacked relation during the molding operation, and to release the molds for separation of the sections and unloading of the articles, in sequence.

For this purpose, a supporting plate 14 is mounted on the ram plate 5 in fixed position relative thereto. The supporting plate 14 has suitable longitudinal guideways 15 on its upper face extending lengthwise of the plate 14. Slidably mounted on the plate 14 and guided by the guideways 15 thereon is a power driven base plate or carier 16 which, at its ends, supports bolsters 17. The bolsters are held firmly in fixed position relative to the plate 16 by means of strain tie rods 19, arranged at the four corners of the bolster plates 17. The mold sections 10a and 10b are slidably supported on the strain rods 19 for sliding guided horizontal movement therealong, while held thereby in accurate alignment flatwise with respect to each other and with their parting planes vertical.

Carried in fixed position on the plate 16 midway between its ends, in the directions of sliding, is a heating platen 21 which also acts as a buttress against which one end of the row of molds is pressed when the molds are to be firmly clamped in closed position in a stack.

Mounted on the bolster plates 17 are reversible hydraulic cylinders 22 in which pistons or rams 23 are reciprocable. Each ram has a bolster plate 24 which is positioned to engage an associated heating platen 25 and drive the platen 25 firmly against the end mold section at the adjacent end of the row and thereby drive the mold sections to closed positions, and the molds into "stacked" face to face juxtaposition with the mold section at the opposite end of the row against the platen 21. The rams 23 are operable independently of each other and of the press, so that the molds between each platen 25 and the central plate 21 can be driven into closed position and clamped between the platen 21 and the associated platen 25 and held in clamped position with sufficient pressure to assure that the mold sections will not separate during the pressurizing and molding operations. On the other hand, each ram may be operated to withdraw its platen 25 to release the pressure on its molds so that the associated molds open for unloading the molded product.

For this latter purpose, suitable springs 28 are disposed between the companion mold sections 10a and 10b of each mold 10 and have sufficient strength so that, when the clamping pressure is released and the associated ram 23 is retracted, they spread the mold sections 10a and 10b of each mold apart to open position. Thus two gangs of molds are provided, one gang at each side of the platen 21. These gangs are manipulated as units, respectively.

It is desirable to move either gang, when clamped in closed condition, endwise into the operating space between the head plate 7 and the plate 14 and concurrently to move the other gang out from the operating space to a charge and discharge position. Further, it is desirable to open the molds of one gang while in the charge-discharge position, discharge articles therefrom, and then reclose and clamp the molds, and recharge the cavities thereof, preparatory to movement of the molds as a gang into the operating space for the molding operation, all while the other gang is in the operating space and the molding operation is proceeding.

For this purpose, a double acting piston and cylinder assemblage 30 is provided. This assemblage comprises a cylinder 31 having a piston therein with a piston rod 32 secured by suitable means to the plate 16 for movement therewith axially of the cylinder 31. The cylinder 31 is connected to a block 34 fixedly secured on a rigid support 35 which, in turn, is in fixed position relative to the bolster plate 5 for lifting and lowering therewith. For steadying the support 35 during its rise and fall with the bolster plate 5, the outer ends of the support 35 carry suitable piston and cylinder assemblages 36, respectively, each of which includes an upright cylinder 37 with a piston reciprocable therein and having a rod 38. The rods 38 carry headers 39 which are fixedly connected to the support 35. These assemblages are supported on their base on the base of the machine or on the floor, and are operated in unison with the ram so that at all times the support 35 is well supported against deflection. Thus one of the rams 23 may be operated to move the associated molds along the rod 19 into face to face relation, as shown at the left in FIG. 1, and clamp them in that relation, and the assemblage 30 then operated to move the gang of molds in closed and clamped position into the operating or mold space of the press in position for the molding operation. At the same time, this latter movement necessarily moves the other gang of molds outwardly beyond the operating space into an unloading and recharge position. There, upon retraction of the right hand ram 23, the molds are fully opened by the springs 28 so that the molded articles can be unloaded.

Figure 1:
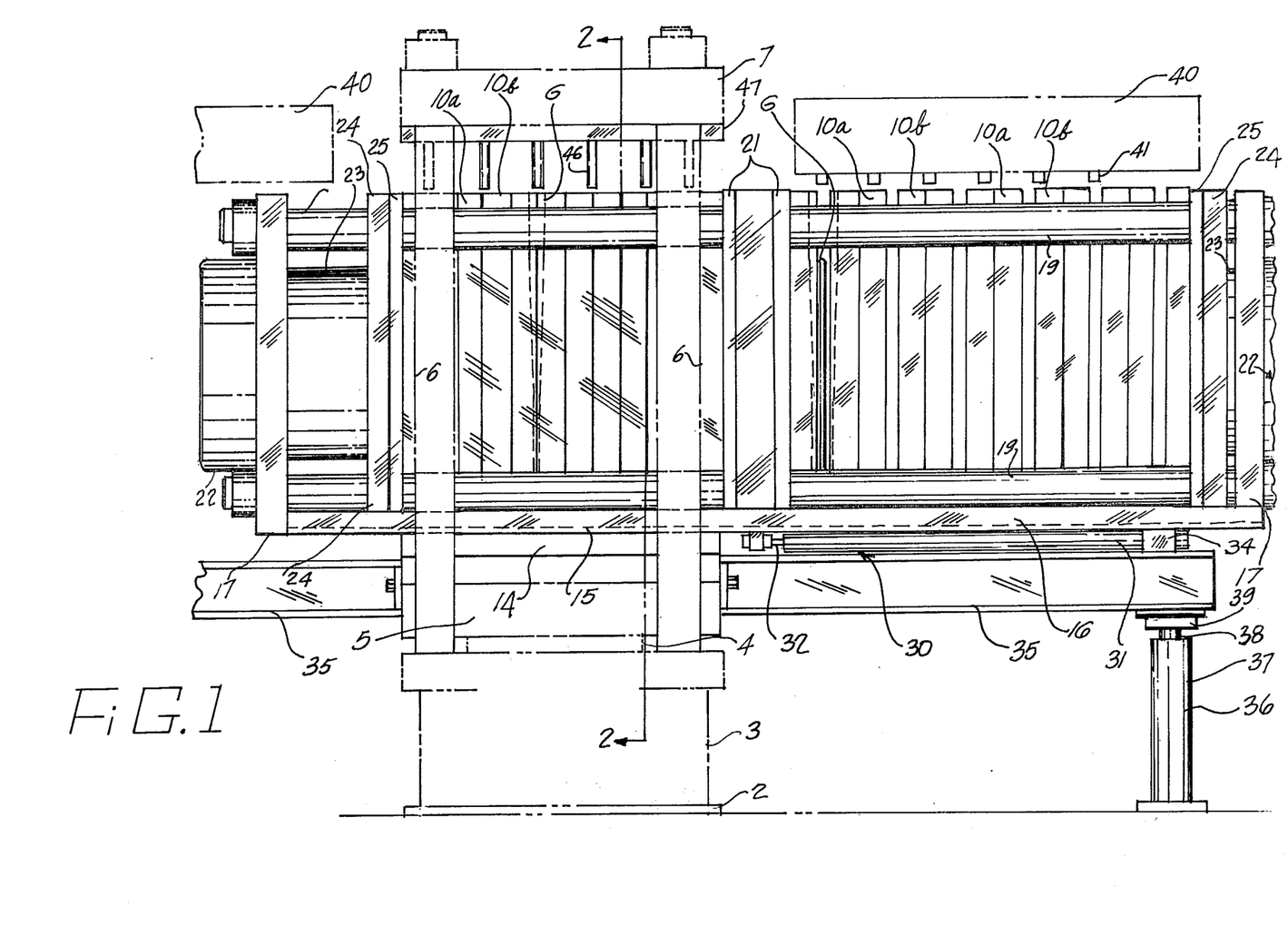
FIG. 1 is a front elevation of a press and mold apparatus embodying the principles of the present invention.
Figure 2:
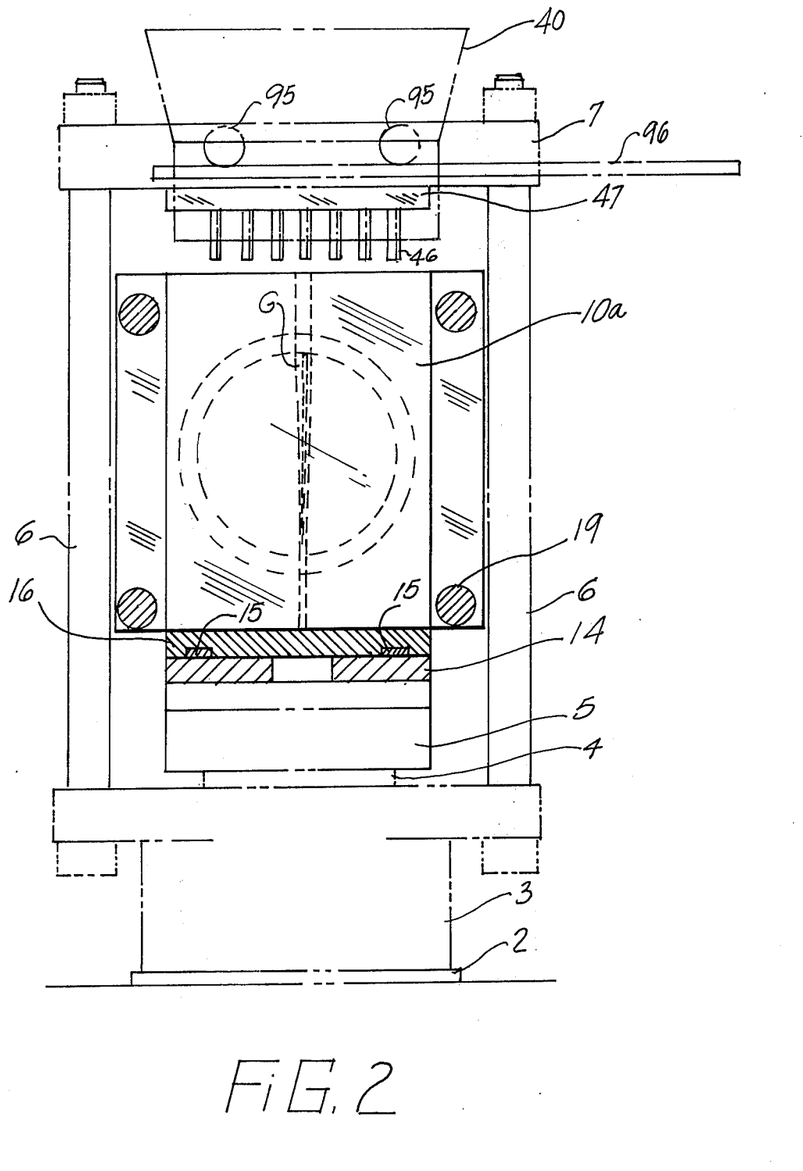
FIG. 2 is a vertical cross sectional view of the apparatus, and is taken on the line 2—2 in FIG. 1.
Figure 3:
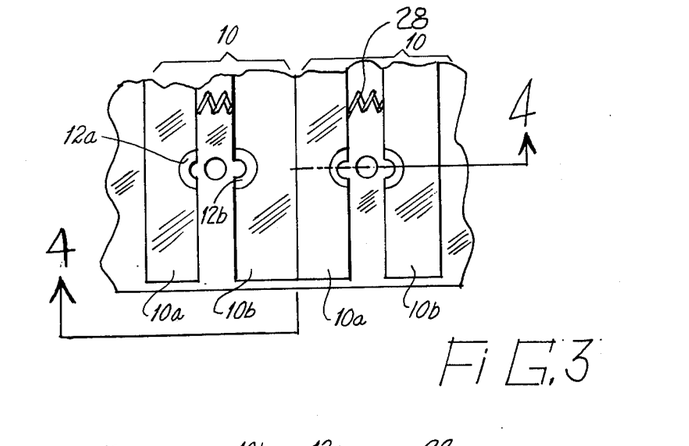
FIG. 3 is a fragmentary top plan view of two adjacent molds of the present invention illustrated in FIG. 1, showing the molds in a gang, the mold sections in open position, and the position in which the mandrel used in connection therewith is disposed.
Figure 4:
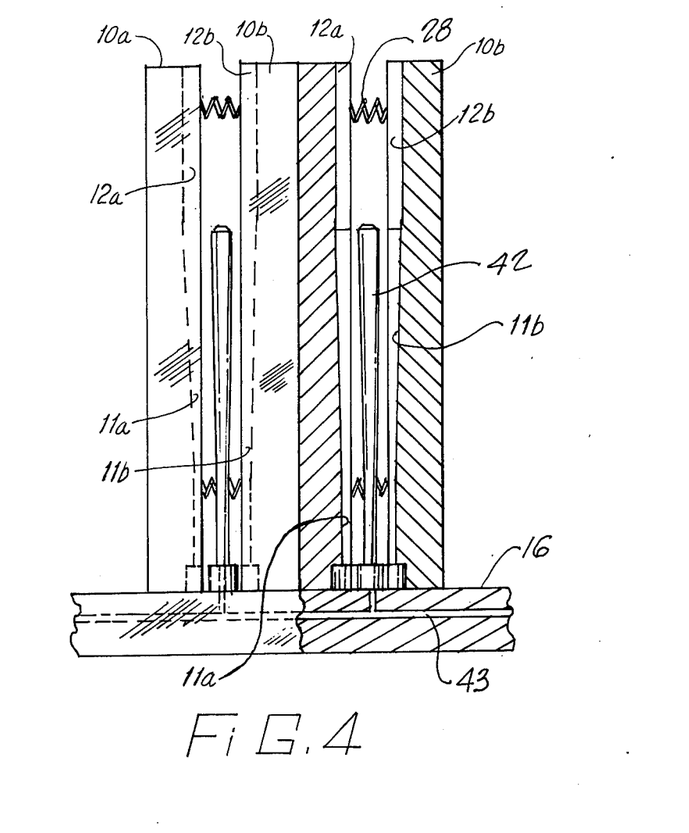
FIG. 4 is a fragmentary vertical sectional view of the molds taken on line 4—4 in FIG. 3.
Figure 5:
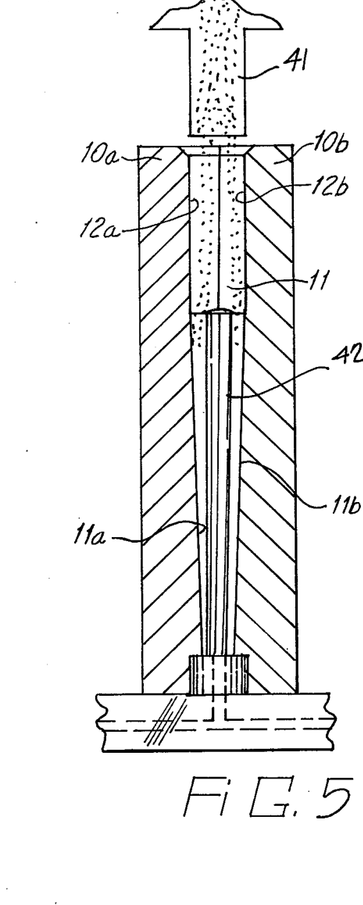
FIG. 5 is an enlarged vertical cross sectional view of one of the molds as illustrated in FIG. 3, with the mold sections closed, and illustrating the manner of charging one of the cavities.
Figure 6:
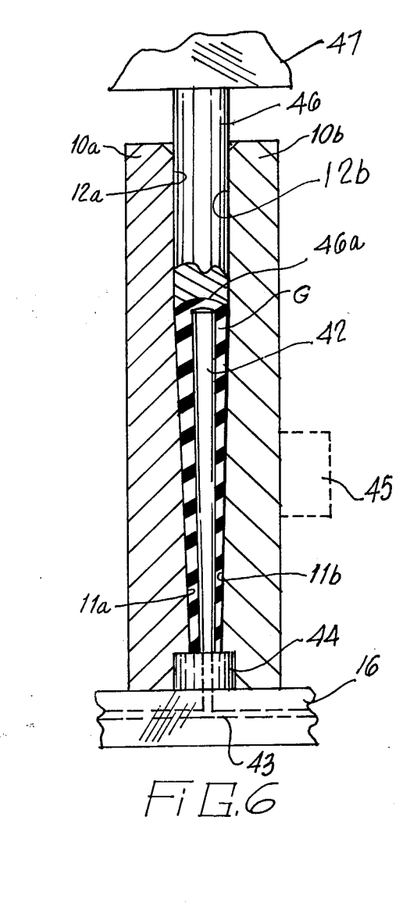
FIG. 6 is a view similar to FIG. 5 but showing part of a press and the reduction of the volumetric capacity of the mold cavity by pressurizing the charge therein by a plunger during molding.

In order to charge the gang of molds in the unloading and recharging position while the other gang is in the operating space in the press and the molding operation is proceeding, two weighing and dispensing devices 40 are provided, one at one side of the press overhanging the path of movement of one gang of molds and the other at the opposite side overhanging the path of the other gang. Thus, as illustrated in FIG. 1, the gang of molds at the right are beneath the right hand weighing and dispensing device 40, and are open for unloading while the molds of the other gang are closed and in the operating space ready for the initiation of the molding operation. During the molding operation, the molds of the right hand gang are opened, the articles discharged, and the ram 23 operated to close the molds under pressure and hold them in closed position. When closed, they are aligned with charging nozzles of the associated device 40. Meanwhile, they are being heated at the one end by the adjacent platen 25 and at the other end the platen 21. The molds, if desired, may be of a type which are cored out to provide passages which can receive controlled steam or electric heating elements, depending upon the heating requirements, all in a conventional manner.

Upon extension of the assemblage 30, the left hand gang of molds is moved to unloading position relative to the left hand weighing and dispensing device 40, and the right hand gang is moved into the operating space in the press. In this position, the left hand molds are opened, the articles unloaded, the left hand molds closed, and recharged by the left hand device 40, preparatory to moving them back into the mold or operating space. Meanwhile, the molding operation is proceeding in the right hand gang of molds.

As mentioned, it is desirable that the articles produced be flashless and for this purpose the clamping pressure provided by the rams 23 is sufficient to hold the molds firmly closed under the pressure of the material within the molds, which pressure can be raised to a considerable degree, depending upon the particular article and material.

Each mold is provided with a multiplicity of cavities and each cavity has its own individual entry passage 12 opening through the upper edge of the mold at the parting plane. The loading devices 40 each has a plurality of nozzles arranged one above each cavity of each mold, when the molds are closed and in the proper position beneath the associated device 40. Each nozzle 41 discharges a metered amount of material into the mold. This metering may be effected by a conventional slide plate with passages therethrough which, when slid to discharging position so as to register the passages with the entry passages, deposits a measured amount of material in the molds, respectively, and which, when returned, has its passages refilled preparatory to the next metered discharge operation.

In the form illustrated, the handle grip G in each mold is molded about an internal core 42 from which it is subsequently removed, when the molds are open, by a compressed air admitted through a duct 43 which leads into the inside of the molded handgrip G. For this purpose, the mandrels 42 are mounted permanently on suitable blocks 44, respectively, rigidly affixed to the plate 16, and through which the ducts 43 extend, as shown in FIG. 8. A conventional system of distribution ducts are provided and are connected to the ducts 43 for admitting pressurized air to all of the ducts 43 concurrently. The ducts 43 extent to, and through, the upper ends of the mandrels 42 so that pressurized air discharged therethrough enters within the handle grip G, inflates the grips G sufficiently to loosen them from the cores, and blows them off of the mandrels over the upper outer ends of the mandrels.

The material may be fed into the molds as particulate matter, which may range from powder size through small granular or pellet size. It is dropped in metered amounts into the mold cavities through the upper open ends of the entry passages by the nozzles 41, arranged one nozzle 41 for each cavity 10. A vibrator 45 may be provided on each mold in order to shake down the material and assure the molds are well filled. In this form of the invention the powder may be dropped into the mold cavities in totally unplasticized condition, or in partially plasticized condition. It is fully plasticized in the mold cavities by heating of the molds, until it is in the proper condition for the molding operation. The article, of course, is not molded by any pressure due to closure of the molds by the press. Instead, each cavity is pressurized separate and apart from the others by reducing its volumetric capacity.

For this purpose, a plurality of plungers 46 are carried by a top plate 47 which, in turn, is mounted on the head plate 7. These plungers are aligned with the entry passages 12 of the cavities 11, one plunger for each cavity. The plungers 46 are of such size and shape that, upon raising of the ram and thereby the molds as a gang, the plungers enter the entry passages 12 of the cavities, respectively. The plungers 46 fit the entry passages 11 with close operating clearance so that no appreciable amount of material can escape between them and the walls of the entry passages. For example, they may fit with a radial clearance of from 0.001 to 0.002 inches, which is close enough to prevent formation of flash between the plungers and the walls of the entry passages. The charges are accurately metered so that the handle grip G would be of uniform size. The lower end of each plunger 46 has a molding surface portion 46a which is contoured to impart the final shape and contour to the part of the product engaged thereby which, in this case, is the entire outer end of the golf club handle grip G. Thus the plunger, in effect, defines a part of the cavity 11.

The metered amount of material is such that when the plungers 46 have reached their final downward position, the predetermined pressure desired is applied to the material in the mold cavity, and thereby the article is of greater density than could be obtained by the prior method of charging the open molds with material selected so that upon closing them, the final molding pressure is obtained. Densification as herein obtained, assists in further plasticizing some materials and rendering the mass more homogeneous.

The rams 23 apply sufficient pressure to the molds so that they are held together and resist any opening whatever due to the pressurization of the charge therein. As a result, the handle grips G are free from flash. Furthermore, since the inner ends of the plungers 46 are shaped to form the surface of the molded article at the part of the charge they engage, there is no excess material to be trimmed off of the ends, as is the case when a plurality of mold cavities in the mold are filled through suitable runners and sprue holes or gates.

The holding clamping pressure of the rams 23, the amount of charge, and the degree of insertion of the plungers 46 are preselected so that precisely the proper amount of molding material under proper pressure is provided, and waste of material is eliminated. The clamping pressure of the rams 23, the applied pressure exerted by the plungers 46, and the heating is maintained until the material is cured. After curing, and after removing the gang of molds from the press, the molds are opened and hot air or steam are admitted to the base of the molded articles, through the ducts 43, so as to expand the articles and blow the articles endwise off of the mandrels 42.

Preferably, the plungers 46 are cylindrical, as also are the entry passages 12 including any part of the entry passages which may be designed to serve also as article forming parts of the cavities in which the outer end portions of the grip G are formed. Generally, it is desirable that the plunger form the entire outer end face of the molded article exposed theretoward, though it is not necessary in all instances. It is particularly desirable, however, for closed end sleevelike articles such as the handle grips G. The foregoing method is particularly applicable to vulcanizable rubber compositions and thermo-setting and thermoplastic materials.

In the form described, the material is actually dropped into the molds, as mentioned, as particulate matter ranging from powder to very small pellets or particles in which no heating has occurred prior to its introduction. It is to be noted, however, that in some instances it is economical to use material which is partially plasticized before introduction into the mold cavities and to inject the material into the mold cavities. If so, the charge is introduced in semi-plasticized condition, or even in fully plasticized condition, but in no sense under the full pressurized condition customarily used in conventional injection molding. The material is preheated to plasticize it to the desired degree before it is introduced into the mold cavities as individual charges. In either type of charging, since the molds are independently clamped, the degree of insertion of the plungers can be increased at any time during molding. The material thereby not only is molded under pressure, but the partially molded material, having become partially set, is subjected to further insertion of the plungers and increased pressure and, in effect, is forged, as distinguished from ordinary pressure molding wherein only the original closing or injection pressure is maintained throughout the molding and setting operation.

Figure 9:
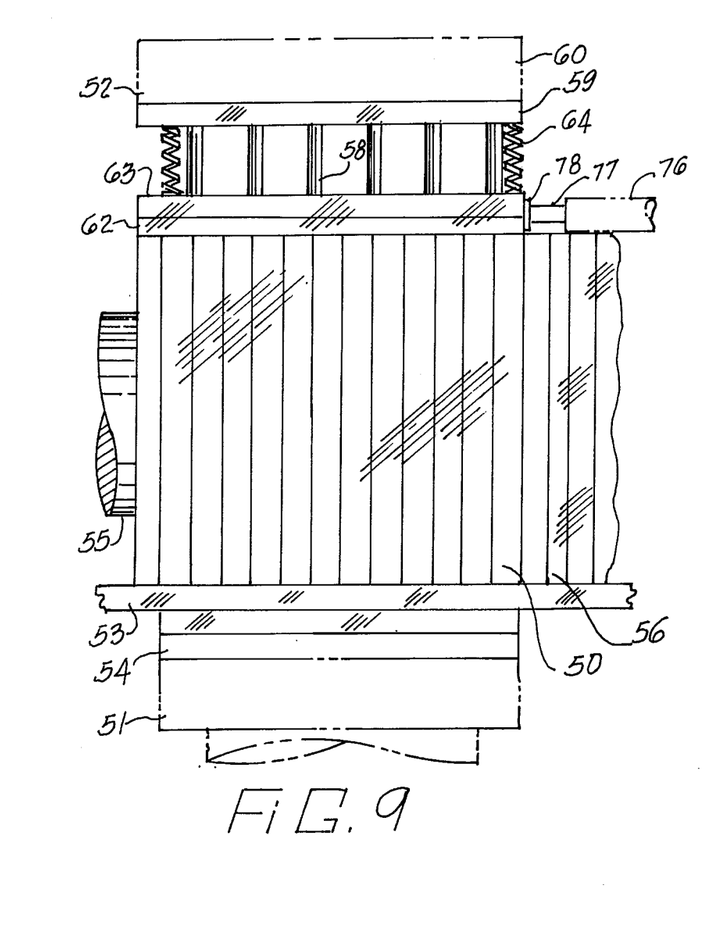
FIG. 9 is a fragmentary front elevation of a modified form of the apparatus suitable for charging by injection techniques.

Again, modified injection molding may be employed. Referring next to FIGS. 9 through 12, a modification of the structure for charging the mold with the material in partially plasticized condition at the time of charging is illustrated. As there illustrated, a gang of molds 50, similar to the molds 10 and similarly supported, are moved into the mold or operating space between a ram 51 and a top plate 52, as indicated. In this form also, the gang of molds 50 are supported on a supporting plate 53, corresponding to the plate 16 heretofore described. The plate 53, in turn, is slidable on a plate 54, corresponding to the plate 14 heretofore described. The molds are held in a closed condition under pressure by the rams 55 against a fixed heated platen 56. Each mold 50 has mating sections 50a and 50b which define a cavity 57 having an entry passage 57a when the molds are in closed position. As pointed out as in the case of the earlier form of the invention, the entry passages 57a are open at their upper ends so as to receive plungers 58, arranged one plunger for each cavity. The plungers are carried on a plate 59 secured on the under side of a head or top plate 60 of a press. Disposed on the upper edges of the molds of the gang is a plate 61 which supports a bottom runner plate 62 which, in turn, supports a top runner plate 63. These runner plates 62 and 63 are separable from each other, as best illustrated in FIG. 11, and are held in firm, but yieldable, closed relation to each other, as shown in FIG. 9, by springs 64 interposed between the plate 63 and the plate 59. These springs are of adequate strength to hold the plates firmly together during the injection of the charges of material into the mold cavities while the plungers 58 are in raised or retracted position. The plates 62 and 63, when brought together, provide runners for the material, as illustrated in FIG. 12. The runners consist generally of main ducts 70 with branches 71 leading therefrom and extending lengthwise of the gang of molds. The ducts 71 lead into the ducts 72 which, in turn, lead into plunger receiving passages 74 in the plate 63 and the passages 75 in the plate 62. The passages 74 are aligned with, and form continuations of, passages 75 in the plate 62. The passages 74 and 75 thus form a continuous passage disposed above and aligned with the entry passages 57a of the cavities 57, respectively. The plate 61 has a plurality of passages 61a coextensive with and forming a continuation of the entry passages 75, when aligned therewith. Charges of material are injected into the passages 74 and 75 through the runners.

Figure 10:
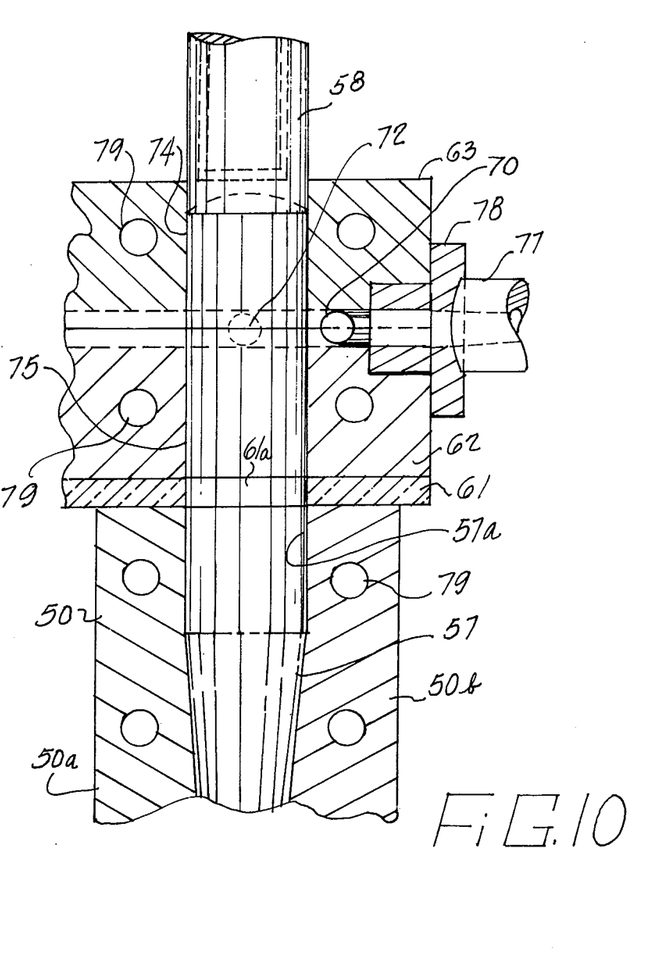
FIG. 10 is an enlarged vertical cross sectional view, taken on the line 10—10 in FIG. 12, illustrating the charging operation.
Figures 11, 12, 13:
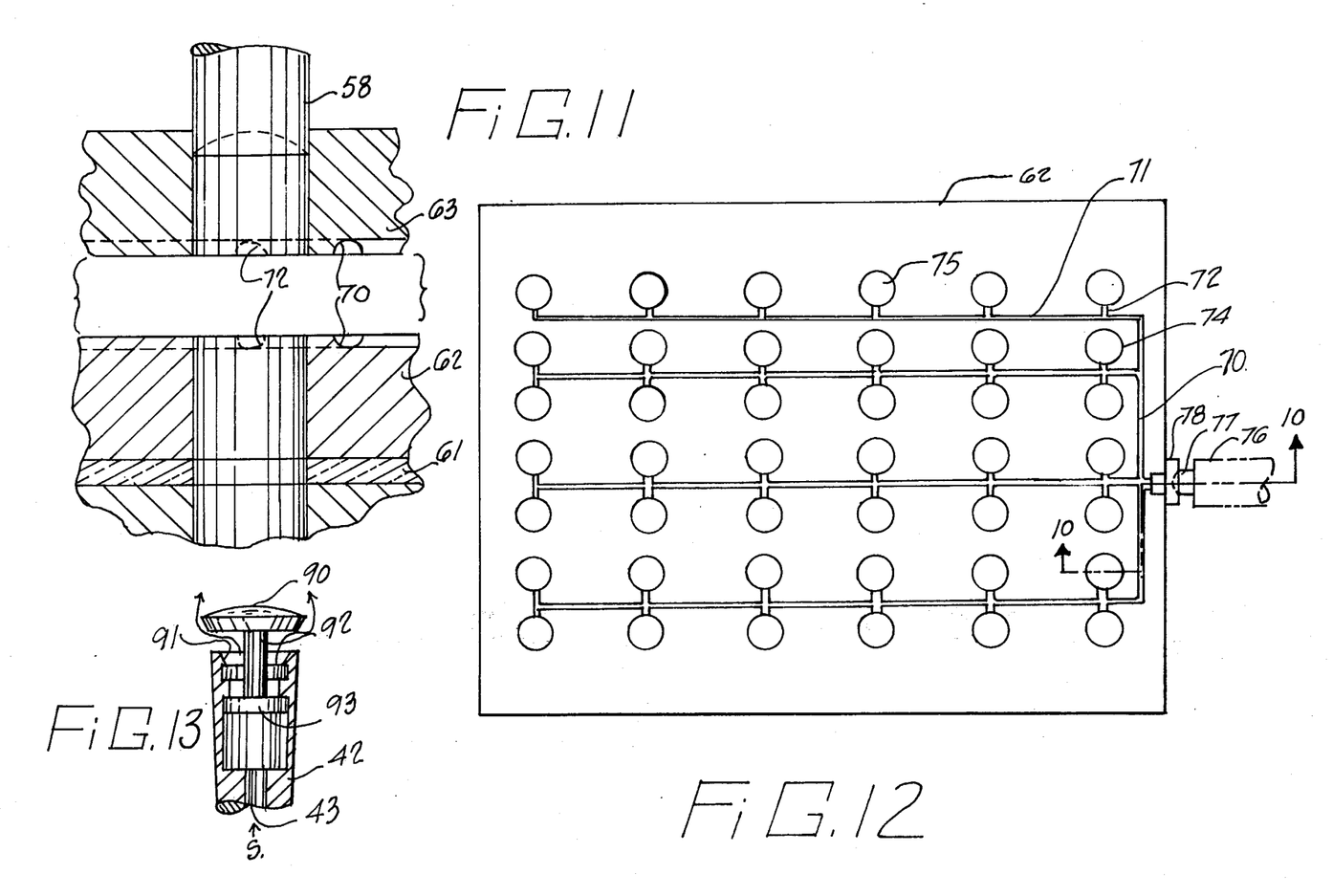
FIG. 11 is a view similar to FIG. 10, showing the relation of certain parts when the charging apparatus is in open condition.
FIG. 12 is a diagrammatic illustration of a system for introducing freshly plasticized material into the individual cavities from an extraneous plasticizing source.
FIG. 13 is a fragmentary vertical sectional view of the upper end of one of the cores showing an optional valving arrangement for ejection air.

The material is plasticized in the conventional plasticizer 76 of the combined work and plunger type, and having an injection nozzle 77 which is detachably engageable with a sprue bushing 78 connected with the runners, such as illustrated in FIGS. 10 and 12.

The plate 61 is slidable endwise of the gang of molds for offsetting the passages 61a concurrently from the passages 75, thus blocking the lower ends of the passages 75, when the passages 61a are in the offset position, and limiting the charges. The plate 61 is then returned to align the passages 61a with the passages 75 so that the charges in the passages 74, and 75, and 61a can be forced into the mold cavities.

The plate 61 may be made of thermal insulating material in those instances where it is desirable to retain heat.

Usually the molds are heated to a much less temperature than the plates 62 and 63. For example, the molds may operate at 150° while the plates operate at 375° to 400°. Therefore, it is desirable that the plates 62 and 63, in such instances, be of insulating material to maintain the differential in temperature between them and the molds. The plungers 58 are aligned so that when the charges are introduced into and fill the passages 74 and 75, and the plate 61 is shifted to permit the resultant charges to enter the entry passages 57a of the mold cavities 57, the plungers are then driven through the passages 74, 75 and 61a into the entry passages 57a of the cavities to effect the molding operation under the desired pressure.

As heretofore described, the inner end of the plunger 58 may be of the configuration of the outer end of the handle grip to be formed and coextensive in cross section with the end thereof and predetermined portions of the entry passages 57a.

With this arrangement, with the plungers 58 retracted, the material to be molded is injected by the nozzle 77. This material may be fully plasticized, or only partially plasticized, the latter usually being the case. In such instance, the material is not injected at the extremely high pressures required for conventional injection molding, but is injected under only sufficient pressure to assure that the passages 74 and 75 are completely filled with material. The amount of the charge is determined by the thickness of the plates, or the position of the plunger axially of the passage 74, or combinations thereof. The charges being thus injected into the passages 74 and 75, the plate 61 is shifted so the charge can enter the mold, and the plungers are lowered, driving the plastic material into the mold cavities and about the core under the desired pressure to mold article and, in effect, to subject it to a forging pressure. As mentioned in the first described form of the invention, the rams 55 exert sufficient pressure on the gang of molds to prevent any separation of the molds by whatever pressurization of the charge therein is effected by the plungers.

Since the plates can be removed and separated, any excess material that might tend to set up in the runners can be removed readily. However, due to the insulation of the plate 61, the loss of heat from the plates 62 and 63 is greatly reduced. Suitable passages or ducts 79 are provided in the plates 62 and 63 and may be used in a conventional manner, for cooling by pumping water therethrough, or for heating by forcing steam therethrough or by the introduction of electrical elements thereinto. Such effects are selected with respect to the particular operation to be performed and the type of material used.

The structure eliminates the amount of waste because the temperature of the plates 62 and 63 is maintained properly so that the material in the runner system is in condition to be driven into the cavities by the next injection of material from the nozzle 77. When used with certain elastomers the plates 62 and 63 may be cooled, but the hot runner system is used for thermoplastic and thermosetting materials.

It is to be noted that the runners are oversize in relation to those conventionally used for injection molding. This is so that the material can be injected at low pressure, the final forming being due not to the pressure of the injection, but imparted by the plungers 58. In these large runners, the material remains in plastic condition so that upon the next injection it can be carried into the molds and utilized. Thus each new injection cleans out the runners and forces the material therein into the molds. Raising of the ram forces the plungers 58 into the mold cavities, and the plungers and entry passages of the cavities are properly formed to hold the material under pressure in the cavities, or forging the material therein, until the material is finally set.

Accordingly, the method and apparatus are applicable to various modable material such as rubber, thermo-setting materials, and thermoplastic materials and the term "plasticizable" material is intended to include the usual rubber compositions and elastomers, and also thermoplastic, thermo-setting and otherwise plasticizable and settable materials. While thermo-setting materials usually are introduced as particulate matter in the form of powder or small granules or pellets, the thermoplastic material is preferably preplasticized and injected, but at pressure much below that which would probably be required for conventional injection molding.

To cover all of these materials, the term "plasticizable organic material" is used, the specific materials used depending upon the product desired. The material used does not change essentially the method of operation, but at most the method of introduction of the material into the mold cavities. The elastomeric materials and thermo-setting materials generally are cured by heat, and during heating a non-reversible chemical reaction takes place. The thermoplastic material plasticizes when heated and sets when it cools, without chemical change and is reversible.

In the prior injection molding, it is often difficult to provide proper air flow between the cores and the walls of the articles for removing the articles by introducing air between the articles and their cores. While this is generally practical with the rubber articles, with other plastic articles, it is more difficult. For this purpose, as illustrated in FIG. 13, the upper end of the core is provided with a valve 90 which seats on a seat 91 and which, when seated, is shaped to form the inner surface of the upper end of the hand grip being molded. The valve has a stem 92 reciprocable in a bore in the core and has an enlarged lower end 93 which permits the valve to rise, but prevents its stem from moving out of the bore in the core. The valve 90 fits the wall of the seat 91 sufficiently tightly to prevent the entry of the material being formed in the space between the valve and seat. With such an arrangement, air or steam supplied to the under side of the valve through the duct 43 unseats the valve and is admitted into the upper end of the cured hand grip G, and expands the grip, breaking it free from the core and blowing it off of the core.

To assure that the weighing and dispensing device 40 does not interfere with the blowing off of the molded articles, each such device is supported by suitable rollers 95 on tracks 96 so that each device 40 can be shifted forwardly and rearwardly of the press, into and out of alignment with the upper edges of the associated gang of molds. Thus each device 40 is moved out of alignment with the gang of molds being unloaded, the hand grips G are then blown off, and the device 40 is moved back into position for charging.

I claim:

1. A molding apparatus adapted to be disposed between a pair of press platens which are power driven along a predetermined path from a starting position relatively toward each other to a final operating position and which are returnable away from each other along said path to the starting position, and comprising:

mold means including at least one mold having a pair of mold sections with matching parting surfaces, respectively, which extend through one edge of the closed mold and which, when the mold is closed, define a plurality of article forming cavities having lineal entry passages, respectively, each of which is open at its outer end through said one edge of the mold and at its inner end into its associated cavity; said entry passages being in spaced relation to each other endwise of said one edge;

each entry passage being lineal and of uniform size and cross section throughout its length and being disposed at, and open at, the parting surfaces of the mold sections, with one part of the passage peripheral wall, which part is coextensive in length with the passage, being disposed on one mold section, and the remainder of said peripheral wall being on the other mold section;

supporting means supporting the mold so that it can be disposed between press platens with the parting surfaces of the mold sections extending in a direction from one platen to the other, and with the said one edge and open ends of the entry passages facing said one platen;

a plurality of plungers, one for each entry passage, aligned endwise with the entry passages, respectively;

each plunger having a leading free end portion insertable endwise into, and fitting with close lateral operating clearance in, its associated entry passage;

means supporting the plungers for endwise movement concurrently, from a starting position spaced from said one edge, into said entry passages, respectively, to apply the leading end surface of each of the plungers, under pressure, to a portion of the material exposed in its associated entry passage and contained in the associated mold cavity, and thereby to pressurize all of the material in all of the cavities, concurrently;

means for returning the plungers to starting position;

clamping means operable, prior to entry of said plungers into said cavities, to move said mold sections to closed position and to clamp them in closed position with sufficient force to resist their separation by the pressurized material occasioned by insertion of the plungers to final position into said entry passages, and operable to open the mold sections for unloading the molding articles therein;

metering means disposed at said one edge of the mold and having metering passages extending entirely therethrough and open at both ends and aligned endwise with said entry passages, respectively; each metering passage being of the same cross sectional shape and size, throughout its length, as its associated entry passage and forming therewith in one operating position of the metering means a continuous uniform passage extending from the outer end of the metering passage to the inner end of the entry passage;

said metering means further including closure means operable selectively to open and close the metering passages concurrently, temporarily, at the ends adjacent their associated entry passages;

said plungers being movable to one position in which they partially enter and block the outer ends of the metering passages, respectively, while the closure means are operative to close the other ends of the metering passages;

said metering means further including an injection sprue and runners which lead from the sprue into said metering passages, respectively; and said plungers being movable concurrently from said one position each entirely through its associated metering passage and into its associated entry passage, while the associated entry passage contains a charge of material and is unclosed by the closure means.

2. A molding apparatus according to claim 1 characterized in that said mold means includes cores in fixed position in the cavities, respectively, and spaced from said entry passages, respectively.

3. A molding apparatus according to claim 2 further characterized in that each core has a surface portion facing away from its associated entry passage.

4. A molding apparatus according to claim 2 wherein each of said cavities and its associated core are shaped to form an elongated tubular article closed at the end adjacent the entrance passage and open at the opposite end; and each core extends from said opposite end of its associated cavity toward the entry passage thereof, and tapers radially inwardly from the end nearest the entry passage to the opposite end.

5. A molding apparatus according to claim 2 wherein each of said cores have duct means therein for conducting pressurized fluid through the core into the interior of the molded article for expanding the article and blowing it off the core when the mold sections are in open position.

6. A molding apparatus according to claim 1 wherein said closure means includes a closure member in sliding relation transversely of the passages and having therein metering passage portions which, in one position of the member, are offset from the entry passages and thereby block communication between the metering passages and the entry passages, and in another position of the member are aligned with the remainder of their associated metering passages and their associated entry passages so as to form continuous uniform passage for each plunger entirely through its associated metering passage and at least partway into its associated entry passage.

7. A molding apparatus according to claim 1 wherein said runners are relatively large and provide for relatively free flow of plasticized material from the sprue to and into the metering passages without developing substantial frictional heat in the material, thereby to fill the metering passages while they are closed by the closure means at the end nearest the entry passages and by the plungers at the other ends.

8. A molding apparatus according to claim 7 wherein a portion of the metering means between the plungers and the closure means comprises two plates having adjacent matching parting faces extending transversely of the metering passages, means support the plates for movement facewise from a charging position in which their matching faces are in contact to a cleaning position in which said matching faces are spaced facewise from each other; and said runners are open laterally at said matching parting faces so that the material can be stripped therefrom by movement transversely of the length of the runners, when the plates are separated.

9. A molding apparatus according to claim 8 wherein each of said runners is disposed throughout its length part in one of said plates and part in the other of said plates.

10. A molding apparatus according to claim 1 further including means for injecting pre-plasticized heated material into said runners at a predetermined pressure, and power means for forcing the plungers into said entry passages under sufficient force to develop in the cavities a pressure different from said injection pressure.

11. A molding apparatus according to claim 1 wherein a second corresponding like gang of molds is correspondingly arranged and operable, the molds of the second gang are supported in a row aligned endwise of said first mentioned row and disposed at one end thereof, and are movable as a unit endwise of the rows, to molding position by movement in the direction of movement of the first mentioned gang out of molding position;

power means are drivingly connected to the second gang so as to drive them into molding position and concurrently to drive the first mentioned gang to unloading position and alternately to drive the second gang to unloading position and concurrently drive the first mentioned gang to molding position;

additional clamping means, operable independently of the first mentioned clamping means, are provided and are operable for moving the molds of the second gang into closed and stacked relation, and for releasing them for opening; and said molds of the second gang have their entry passages arranged to be aligned with, and to slidably receive, the same set of plungers as are receivable in the first mentioned gang of molds when the second gang of molds is in its said molding position.

12. A molding apparatus according to claim 1 wherein said mold means comprise a gang of separate individual molds, one of which is said one mold, and each of which has a pair of mold sections which, when closed, define an article molding cavity having an entry passage opening through one edge of the mold at the parting surface in like manner as said one mold;

said supporting means support the gang of molds on edge in a row in face to face relation to each other in open condition with said entry passages opening in the same direction and in spaced relation to each other endwise of the associated mold edge; and for movement flatwise endwise of the row toward each other into closed position, respectively; and into face to face stacked relation to each other, in a loading position, and for movement as a gang while in said closed and stacked relation, into and out of a molding position between the platens, respectively;

means are provided to move said gang of molds, as a unit, to said positions, selectively;

said clamping means are power operated and are operable to apply clamping pressure to the end molds of the gang first to move the mold sections into closed position and then to clamp the molds in said closed and stacked relation while they are in loading position and to maintain them so closed and stacked while the gang is moved as a unit into, and remains in, the molding position, and to release the clamping pressure when they are in the unloading position; and means are provided to move the mold sections apart from each other when the clamping means are released.

13. A structure according to claim 6 wherein said member is of heat insulating material.

* * * * *